United States Patent
Schorn et al.

Patent Number: 6,001,250
Date of Patent: Dec. 14, 1999

[54] CONNECTING MEANS WITH SIEVE ELEMENT FOR A WATER FLOW APPLIANCE

[75] Inventors: Franz Schorn, Schiltach; Gerd Blessing, VS-Obereschach, both of Germany

[73] Assignee: Hans Grohe GmbH & Co. KG, Germany

[21] Appl. No.: 08/928,938

[22] Filed: Sep. 12, 1997

[30] Foreign Application Priority Data

Sep. 12, 1996 [DE] Germany .................. 196 37 100

[51] Int. Cl.⁶ ............................................. B01D 29/33
[52] U.S. Cl. ........................ 210/235; 210/236; 210/411; 210/445; 210/448; 210/459
[58] Field of Search ...................... 210/232, 235, 210/236, 409, 411, 445, 446, 448, 459, 499

[56] References Cited

U.S. PATENT DOCUMENTS

| | | | |
|---|---|---|---|
| 2,019,094 | 10/1935 | Rice et al. | 210/445 |
| 2,658,625 | 11/1953 | Rafferty | 210/445 |
| 3,786,995 | 1/1974 | Manoogian et al. | 239/428 |
| 3,992,886 | 11/1976 | Scott | 210/445 |
| 4,052,315 | 10/1977 | Lindsay, Jr. et al. | 210/445 |
| 4,422,938 | 12/1983 | Miller | 210/448 |
| 4,477,352 | 10/1984 | Pappas | 210/448 |
| 4,518,493 | 5/1985 | Badders | 210/137 |
| 4,627,916 | 12/1986 | Dorsam | 210/488 |
| 4,743,365 | 5/1988 | Noland | 210/106 |
| 4,806,248 | 2/1989 | Murken | 210/448 |
| 5,492,143 | 2/1996 | Cooper et al. | 210/445 |

FOREIGN PATENT DOCUMENTS

| | | |
|---|---|---|
| 0332167 | 9/1989 | European Pat. Off. . |
| 2264724 | 10/1974 | Germany . |
| 2445199 | 4/1976 | Germany . |
| 2658742 | 7/1978 | Germany . |
| 8433406 | 2/1985 | Germany . |
| 3916472 | 10/1990 | Germany . |

*Primary Examiner*—Christopher Upton
*Attorney, Agent, or Firm*—Duane, Morris & Heckscher LLP

[57] ABSTRACT

A connecting means for a water flow appliance, for example a hand shower, contains a connecting element connected to a water guide, for instance, a house water mains. Arranged in the connecting element is a sieve element which can be shifted between a sieve position, in which it acts a sieve, and a cleaning position in which it is possible to remove the particles retained in the sieve element. The sieve position is always assumed when a connection is made to the connecting means. When this connection is removed the sieve element can be translated into the cleaning position for example by water pressure. The water flow can be passed through said sieve element in the cleaning position preferably in the reverse direction so that said sieve element is back-washed.

18 Claims, 1 Drawing Sheet

CONNECTING MEANS WITH SIEVE ELEMENT FOR A WATER FLOW APPLIANCE

TECHNICAL FIELD AND BACKGROUND OF THE INVENTION

The invention is based on a connecting means for a water flow appliance. Such a connecting means may be, for example, a wall connecting bend fixedly connected to the house water mains and to which for example with the aid of a thread a hand shower can be screwed with the aid of a shower hose, the hand shower then representing the water flow appliance.

The connection of the hand shower to the end of the shower hose may also be termed as the connecting means for the water flow appliance, namely the hand shower.

Attaching a shower hose to a mixer may also be done with the aid of a connecting means.

The invention involves primarily connecting means in the sanitary field, but is not restricted to this field.

It is known that deposits, for example, particles of lime may occur in tap water which have formed and then dissolved, Particles of sand and rust may also be present in the water.

Sieves are often to be found in sanitary mixers, these sieves being inserted in the water pipe and usually constituting a wire mesh formed flat through which the water flows.

Also known is to employ combinations of seals and sieves for connecting flexible tubes, the sieve openings being contained in the rubber-like material of the seal.

Although all of these known sieves retain the particles, they are a nuisance in needing to be cleaned, this as a rule requiring the connecting means to be unscrewed and the sieve removed which may prove difficult under circumstances. Then, the removed sieve needs cleaning, also requiring deliming, where necessary.

SUMMARY OF THE INVENTION

The invention is based on the object of providing a connecting means for a water flow appliance, wherein cleaning the sieve can be done easier.

To achieve this object the invention proposes a connecting means comprising a connecting element connected or connectable to a water guide to which the water flow appliance can be releasably connected directly or indirectly, a sieve element comprising a sieve position which the sieve element assumes when the appliance is connected, and a cleaning position into which the sieve element is urged when the appliance is not connected and in which cleaning the sieve element is possible. Further aspects of the invention are the subject matters of the sub-claims.

In the case of the connecting means as proposed by the invention it is thus no longer necessary to disassemble the actual sieve elements, it instead being sufficient to release the connection of the water flow appliance at the connecting means, upon which the sieve element can then be brought into the cleaning position. In this cleaning position the actual sieve surface area is accessible so that the particles existing there can be removed, for example, simply by shaking or brushing the sieve element, after which the water flow appliance can be reconnected without the sieve element being able to become lost.

One possibility of how the sieve element can be urged into the cleaning position consists of it being movable by its own weight. Depending on the mounting arrangement of the element in which the sieve element is mounted the sieve element can thus be urged into the cleaning position.

A second possibility of cleaning the sieve consists of it being urged into its cleaning position by spring force. Since no heavy forces are required for this purpose, a very light and small spring is sufficient.

Yet a further possibility preferred by the invention consists of configuring the sieve element so that it can be urged by the water flowing through the connecting element. This possibility has the advantage that no additional elements are needed. After having released the connection the water is simply briefly turned on again so that the sieve element assumes its cleaning position. This possibility is particularly of advantage when, as proposed in a further aspect of the invention, the cleaning position is configured such that backwashing of the sieve element can take place therein, i.e. the cleaning position is a backwash position in which the sieve element is flushed by the water flowing through the connecting element in another direction so that the particles retained in the filter can be flushed away.

The sieve element may be accommodated, for example, in the part leading to the water flow appliance. In the aforementioned example this could thus be the sieve element in the hand shower when the connecting means proposed by the invention is arranged at the end of the shower hose. This configuration has the advantage that existing connecting means can be retrofitted.

It is particularly favorable, however, when the sieve element is mounted in the connecting element itself.

In yet a further aspect of the invention it may be provided for that the sieve element is mounted shiftable between the extreme positions forming the sieve position and the cleaning position respectively. In this case the sieve element can be configured very simply, preferably as an integral element.

In still a further aspect of the invention it may be provided for that the sieve element is mounted replaceable, this replaceability meaning likewise that the sieve element can be retrofitted which is of advantage in assembling the connecting means.

More particularly it may be provided for in accordance with the invention that the sieve surface area of the sieve element is the shell surface area of a cylinder, a cuboid or the like through which the water flows preferably from the outside inwards. In this configuration it may be ensured that the actual sieve surface area is configured large relative to the cross-sectional surface area of the water guide so that the risk of clogging quickly occurring is eliminated. Arranging the sieve surface area on the outside has the advantage that it has facilitated access in the cleaning position.

More particularly it may be provided for that the sieve element comprises a plurality of parallel rods, the interspaces of which form the sieve openings. Such a sieve element can be fabricated of a plastics material very simply and very easily by injection molding.

In yet a further aspect it may be provided for that the rods are formed integrally on a closed ring. This closed ring not only holds the individual rods together it also serves simultaneously as a guiding stop element.

In still a further aspect it may be provided for that the rods comprise at their end facing away from the closed ring radially outwards and/or inwardly oriented hook-like projections. These projections define the shifting movement of the sieve element from the sieve position into the cleaning position and vice-versa. They may also serve to make it possible to release the sieve element and thus to remove the sieve element by the rods being bent by hand.

It is particularly favorable when the connecting means is provided with a quick-release coupling so that the advantage of facilitated cleaning of the sieve element can be made use of.

The connecting element in accordance with the invention may be configured more particularly as a screw nipple which can be screwed to the end of a shower hose.

BRIEF DESCRIPTION OF THE DRAWING

Further features, details and benefits read from the claims worded with respect to the contents of the description, from the following description of a preferred embodiment of the invention as well as from the drawing in which:

DETAILED DESCRIPTION

Figure 1:
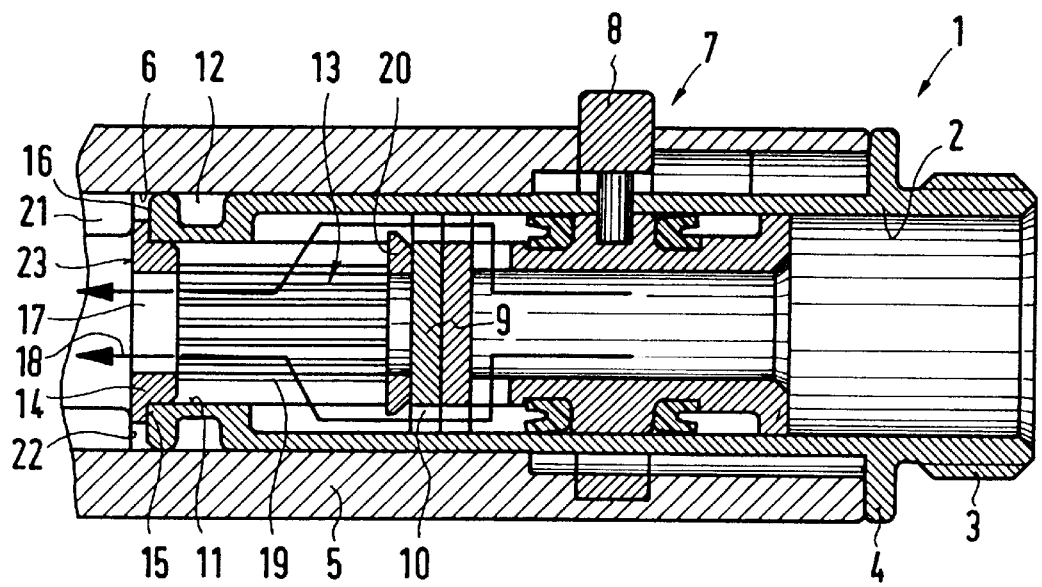
FIG. 1 is a longitudinal section through a connecting means in the form of a connecting nipple for connecting a hand shower.

FIG. 1 shows in a longitudinal section one possibility as to how the connecting means proposed by the invention can be achieved. The connecting means contains a connecting element 1 which in the example illustrated is a connecting nipple 2 for connecting a shower hose. The connecting nipple 2 features an elongated cylindrical shape and is provided at its end, shown on the right in FIG. 1, with a male thread 3 for a union nut. Adjoining the male thread 3 is a radial flange 4 which simultaneously defines the insertion depth in the end of the handle 5 of a hand shower. Only the end portion of the handle 5 is depicted, it containing a cylindrical internal bore 6 open towards the end. The outer diameter of the connecting nipple 2 corresponds to the inner diameter of this internal bore 6 so that the connecting nipple 2 can be inserted and located in the internal bore 6 with a minor clearance until the flange 4 comes into contact with the connecting nipple 2 in the handle 5. To define the connecting nipple 2 in the handle 5 of the hand shower a quick-release coupling 7 is provided which can be opened and closed by means of a actuating handle 8.

Formed in the connecting nipple 2 is a transverse wall 9 featuring in the region of its outer circumference several through-ports 10 for the water flowing through the connecting nipple 2. The water is thus able to pass the transverse wall 9 only through the ports 10.

In the region of the end of the connecting nipple 2 facing away from the male thread 3 the connecting nipple 2 comprises a opening 11 of lesser diameter, at the outer side of which a circumferential annular groove 12 is provided for inserting a seal (not shown).

The internal bore 6 is cylindrical in shape. Slidingly retained in the bore 11 is a sieve element 13. The sieve element 13 comprises at its end assigned to the free end of the connecting nipple 2 a ring element 14 containing an outer shoulder 15 formed by a step, it being by this shoulder 15 that the ring element 14 is in contact with the face surface area 16 of the connecting nipple 2. The ring element 14 comprises a central opening 17 through which the water is able to flow as indicated by the arrows 18.

Located at the end of the sieve element 13 opposite the ring element 14 the sieve element 13 is in contact with the transverse wall 9 by one face surface area.

Since the outer diameter of the sieve element 13, corresponding to the inner diameter of the bore 11, is smaller than the inner diameter of the connecting nipple 2 in the portion between the bore 11 and the transverse wall 9 the water is able to flow only radially from the outside inwards through the sieve element 13. The sieve element 13 contains individual rods 19 formed on the ring element 14, all of which are oriented parallel to each other and are provided in the region of its end oriented in the interior of the connecting nipple 2 with hook-like ears projecting radially outwards. All rods 19 are oriented parallel to each other and form between each other narrow interspaces forming the sieve openings of the sieve element 13.

Formed at the inner side of the internal bore 6 of the shower hose are individual protuberances the face surface areas of which facing the outer end of the handle 5 come into contact with the outer face surface area 23 of the ring element 14. The ring element 14 is thus non-shiftingly defined by its outer flange between the face surface areas of the protuberances and the face surface area 16 of the connecting nipple 2. The position as shown in FIG. 1 in which the water is able to flow only radially from the outside inwards through the sieve element 13 in the direction of the arrows 18 is the sieve position of the sieve element 13. This sieve position is always assumed when the connecting element 1 is inserted into the handle 5 of the shower and coupled in place with the aid of the quick-release coupling 7. No movement of the sieve element 13 is possible in this position. Any particles contained in the water remain attached to the outer side of the sieve element 13 whilst the water passes through the interspaces between the individual rods 19.

Figure 2:
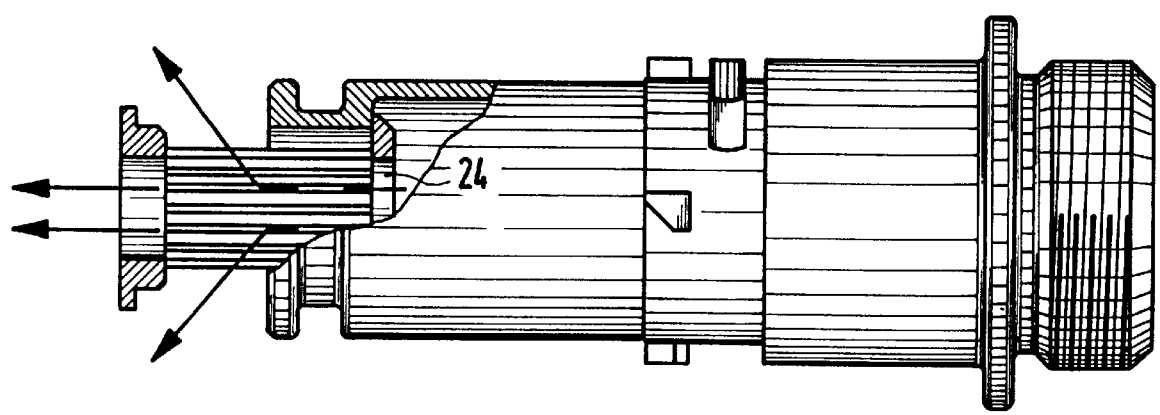
FIG. 2 is a partly sectioned side view of the connecting element as shown in FIG. 1 in the cleaning position.

Releasing the connecting means is done by turning the quick-release coupling 7 with the aid of the actuating button 8 to release the quick-release coupling 7 so that the shower handle 5 can then be removed from the connecting element 1. When the water supply to the connecting nipple 2 is then briefly opened, i.e. building up water pressure in the connecting nipple 2, the water pressure displaces the sieve element 13 from its sieve position as shown in FIG. 1 outwards into the cleaning position as shown in FIG. 2. In this cleaning position the sieve element 13 is shifted as far as permitted by the hook-shaped projections 20 at the end of the rods 19. The outer edges of the projections 20 are located on a circle, the diameter of which is larger than the inner diameter of the bore 11. At least a few of the rods 19 are located by their outer sides on a circle, the diameter of which equals the inner diameter of the bore 11, as a result of which a guiding action is attained. In the cleaning position as shown in FIG. 2 the water flows through a port located centered between the projections axially past the inner side of the rods 19, on the one hand, and at least in part through the interspaces between the rods 19 from inwards outwardly, on the other, as a result of which the particles retained there can be flushed away if they have not already become dislodged by themselves. The translation from the sieve position of the sieve element 13 as shown in FIG. 1 into the cleaning position as shown in FIG. 2 can be made solely by the weight of the sieve element 13 itself when the connecting element 1 is held with its sieve element 13 downwards. Otherwise the translation can be made by reinstating the water supply to the connecting nipple 2.

Translating the sieve element 13 from the sieve position into the cleaning position may also be done without the user realizing it. The sieve element 13 may also be translated into the cleaning position by a light shaking movement.

To return the sieve element 13 from the cleaning position into the sieve position no further action is needed on the part of the user since by inserting the connecting nipple 2 into the handle 5 of the hand shower the protuberances 21 push the sieve element 13 back into place.

Whilst in this described embodiment the sieve element 13 is retained and guided in the connecting element 1, i.e. the part from which the water emerges, it is of course just as possible to retain and mount the sieve element 13 in the water flow appliance, i.e. in the handle 5 of the hand shower in the example illustrated. In this case too, the sieve element 13 can be urged into the cleaning position on release of the connection by the force of the weight concerned or with the aid of a weak spring, whereby in the cleaning position no automatic backwash by the water can take place. However, even in this case too, the particles retained by the sieve element 13 can be removed from the outside, should they not have already become dislodged by themselves, for example, also with the aid of a jet of water emerging from the connecting nipple 2. Also possible is to brush off the particles with the aid of a stiff brush.

What is claimed is:

1. A connecting means for a water flow appliance, comprising:
    a connecting element at least one of connected and connectable to a water guide to which the water flow appliance is at least one of directly and indirectly releasably connected,
    a sieve element retained in said connecting element, said sieve element being movable between a sieve position and a cleaning position in which cleaning the sieve element is possible, wherein the sieve element assumes the sieve position when the appliance is connected, and the sieve element assumes the cleaning position when the appliance is disconnected.

2. The connecting means as set forth in claim 1, wherein said sieve element is urged by its own weight.

3. The connecting means as set forth in claim 1, wherein said sieve element is urged by spring force.

4. The connecting means as set forth in claim 1, wherein said sieve element is urged by the pressure of the water flowing through said connecting element.

5. The connecting means as set forth in claim 1, wherein said cleaning position of said sieve element is configured such that a backwash takes place therein.

6. The connecting means as set forth in claim 1, wherein said sieve element is shiftingly retained between two extreme positions forming said sieve position and said cleaning position respectively.

7. The connecting means as set forth in claim 1, wherein said sieve element is retained replaceably.

8. The connecting means as set forth in claim 1, wherein the sieve surface area of said sieve element is the shell surface area of one of a cylinder and a cuboid, the flow passing through this sieve surface area preferably from the outside inwards.

9. The connecting means as set forth in claim 1, wherein said sieve element comprises a plurality of parallel rods, the interspaces of which form the sieve openings.

10. The connecting means as set forth in claim 9, wherein said rods are formed integrally on a closed ring element.

11. The connecting means as set forth in claim 9, wherein said rods comprise at one end hook-like projections oriented radially outwards and/or inwards.

12. The connecting means as set forth in claim 1, wherein said connecting element comprises a quick-release coupling for connecting the appliance.

13. The connecting means as set forth in claim 1, wherein said connecting element comprises a screw nipple connectable to the end of a shower hose.

14. The connecting means as set forth in claim 1, wherein said connecting element is one of an S connection, and a connecting port for a shower hose.

15. The connecting means as set forth in claim 1, wherein said connecting element is part of a fitting connector block.

16. The connecting means as set forth in claim 1, wherein said water flow appliance is one of a shower, a spray nozzle and a spray gun.

17. The connecting means as set forth in claim 1, wherein said water flow appliance is one of a sanitary fitting, a mixer valve and a thermostat.

18. A connecting means for a water flow appliance, comprising:
    a connecting element at least one of connected and connectable to a water guide to which the water flow appliance is at least one of directly and indirectly releasably connected,
    a sieve element movable between a sieve position and a cleaning position in which cleaning the sieve element is possible, wherein the sieve element assumes the sieve position when the appliance is connected, and the sieve element assumes the cleaning position when the appliance is disconnected, wherein said sieve element is shiftingly retained between two extreme positions forming said sieve position and said cleaning position respectively.

* * * * *